United States Patent
Schreiber et al.

(10) Patent No.: US 9,621,002 B2
(45) Date of Patent: Apr. 11, 2017

(54) PERMANENT MAGNET ROTOR FOR AN ELECTRONICALLY COMMUTATED DC MOTOR

(71) Applicant: Buehler Motor GmbH, Nüremberg (DE)

(72) Inventors: Thomas Schreiber, Freystadt (DE); Georg Bonk, Fürth (DE)

(73) Assignee: Bühler Motor GmbH, Nürnberg (DE)

( * ) Notice: Subject to any disclaimer, the term of this patent is extended or adjusted under 35 U.S.C. 154(b) by 94 days.

(21) Appl. No.: 14/828,806

(22) Filed: Aug. 18, 2015

(65) Prior Publication Data
US 2015/0357872 A1 Dec. 10, 2015

Related U.S. Application Data

(63) Continuation of application No. PCT/DE2014/200031, filed on Jan. 28, 2014.

(30) Foreign Application Priority Data

Apr. 11, 2013 (DE) .................. 10 2013 206 438

(51) Int. Cl.
*H02K 1/28* (2006.01)
*H02K 1/27* (2006.01)

(52) U.S. Cl.
CPC ............. *H02K 1/28* (2013.01); *H02K 1/276* (2013.01)

(58) Field of Classification Search
CPC ................................ H02K 1/276; H02K 1/28
(Continued)

(56) References Cited

U.S. PATENT DOCUMENTS 3,091,713 A * 5/1963 Latta .................. H02K 1/17
310/154.14
4,137,884 A * 2/1979 Odazima .............. H02K 1/2786
123/149 D
(Continued)

FOREIGN PATENT DOCUMENTS

JP 2004-120829 A 4/2004
JP 2004-238963 A 8/2004
(Continued)

OTHER PUBLICATIONS

International Search Report dated Feb. 27, 2015, issued in counterpart Application No. PCT/DE2014/200031(2 pages).

*Primary Examiner* — Alex W Mok
(74) *Attorney, Agent, or Firm* — Westerman, Hattori, Daniels & Adrian, LLP (57) ABSTRACT

In a DC motor, a permanent magnet rotor comprising a shaft, a rotor sheet packet supported by the shaft, which rotor sheet packet comprises close to the periphery thereof completely closed and tangentially extending rectangular recesses for receiving planar permanent magnet plates. At least one permanent magnet plate is accommodated in each recess, the permanent magnet plates are held by spring elements free of play by force locking, the recesses have free spaces connected to the permanent magnet plates in the tangential direction, which free spaces extend across the major part of the side surfaces of the permanent magnet plates and the rotor sheet packet consists essentially of a radial outer annular region and a radial inner core region, wherein the annular region in a large part is delimited by the recesses and the free spaces and is integral with the core region via thin radial webs.

20 Claims, 9 Drawing Sheets

(58) Field of Classification Search
USPC .................................................. 310/156.16
See application file for complete search history.

(56) References Cited

U.S. PATENT DOCUMENTS

| | | | | |
|---|---|---|---|---|
| 4,580,072 | A * | 4/1986 | Morishita | H02K 23/04 310/154.15 |
| 4,745,319 | A * | 5/1988 | Tomite | H02K 1/17 310/154.15 |
| 4,933,582 | A * | 6/1990 | Hata | H02K 5/145 310/154.14 |
| 5,109,172 | A * | 4/1992 | Pace | H02K 23/04 310/154.43 |
| 5,723,929 | A * | 3/1998 | Niimi | H02K 23/04 310/152 |
| 5,763,974 | A * | 6/1998 | Vacca | H02K 1/17 310/152 |
| 6,603,232 | B2 * | 8/2003 | Van Dine | H02K 1/2773 310/152 |
| 7,679,250 | B2 * | 3/2010 | De Godoy | H02K 23/04 310/154.14 |
| 7,768,168 | B2 * | 8/2010 | Aschoff | H02K 1/2733 310/156.08 |
| 8,058,760 | B2 * | 11/2011 | Hirabayashi | H02K 1/185 310/154.03 |
| 2007/0004009 | A1 | 1/2007 | Dixit et al. | |

FOREIGN PATENT DOCUMENTS

JP     2004328963 A  * 11/2004
JP     2010-233413 A    10/2010

\* cited by examiner

PERMANENT MAGNET ROTOR FOR AN ELECTRONICALLY COMMUTATED DC MOTOR

CROSS-REFERENCE TO RELATED APPLICATIONS

The present patent application is a continuation of International Application No. PCT/DE2014/200031, filed Jan. 28, 2014, which is based on, and claims priority from, German Application No. 10 2013 206 438.1, filed Apr. 11, 2013, both of which are incorporated herein by reference in their entireties.

BACKGROUND OF THE INVENTION (1) Field of the Invention

The invention relates to permanent magnet rotors for electronically commutated direct current motors with a shaft and a laminated rotor core carried by the shaft.

(2) Description of Related Art Including Information Disclosed Under 37 CFR §1.97 and §1.98

From US 2007/004009 A2, a generic rotor is known, in which, in an inner region of the laminated rotor core, which is radial to the permanent magnet plates, there are additional recesses, which are open to the recesses for the permanent magnet plates. Spring elements, which exert an outward radial force on the permanent magnet plates, are inserted into each of these additional recesses. This known solution has the disadvantage that the permanent magnet plates are not clearly fixed in the tangential direction by the spring force; as a result, the magnets may move under external load within the recess at right angles to the spring force. The springs furthermore have no effect on imbalances, which may possibly arise. An additional disadvantage exists therein that, due to the additional recess, the magnetic resistance of the magnetic circuit is increased because the recess is arranged in the main flux region.

BRIEF SUMMARY OF THE INVENTION

The present invention is directed to a permanent magnet rotor for an electronically commutated direct current motor with a shaft and a laminated rotor core carried by the shaft. The laminated rotor core has rectangular recesses extending tangentially, that are closed over the entire circumference of the laminated rotor core, near its periphery, for the accommodation of planar permanent magnet plates. At least one permanent magnet plate is accommodated in each recess, and the permanent magnet plates are held non-positively without play by spring elements. The recesses have in the tangential direction clearances adjoining the permanent magnet plates, which clearances extend over the majority of the side surfaces of the permanent magnet plates. The laminated rotor core is essentially comprised of a radial outer ring region and a radial inner core region, wherein the ring region is in large part limited by the recesses and the clearances and is integral with the core region over thin radial webs.

No additional recesses in the laminated rotor core are necessary for the spring elements, because they are housed in the already present clearances adjoining the permanent magnet plates. Therefore, there is no danger of weakening the magnetic circuit and, with this, limited power of the electric motor. In order to prevent a magnetic short circuit, the spring elements are produced from a non-magnetic material. This is important because the magnets are disposed in a region, which is recessed to form a magnetic resistance and prevent a magnetic short circuit. Due to the spring forces acting predominantly tangentially on planar side surfaces of the permanent magnet plates, all magnets are pushed in the same direction or at least aligned so that the magnets are arranged symmetrically around a rotation axis of the permanent magnet rotor, whereby imbalances are avoided. By definition, the radii of the permanent magnet plates, which adjoin the side surfaces, are also counted among the side surfaces. The webs, which border the clearances, or the side surfaces of other permanent magnet plates, may serve as a support surface for the spring elements. The spring elements produce a reliable, secure mounting of the permanent magnet plates in that they hold these at ends that are situated opposite the spring elements in a radial position free of play. Contrary to methods employing adhesives, the rotor weight may be kept calculably and reproducibly within narrow limits.

Provisions are made so that the spring elements are sheet metal strips, which are curved in a V-shape and/or U-shape. These are particularly simple to manufacture and may also be supplied simply during the installation, for example in that they are supplied taped together as strip stock. The springs may also transition over their length from a V-shaped form into a U-shaped form, wherein they have a triangular yoke, which connects the spring legs to one another. This embodiment facilitates the installation significantly. Such sheet metal springs may simply be adapted to different requirements by changing the sheet thickness, the spring material, and the spring geometry to meet the different requirements. Moreover, curved sheet springs allow the design of the magnetically optimized sheet section to be retained without modification. In principle, the sheet section may also be used as needed for other attachment methods without modifications. Examples of such attachment methods are adhesion, joining by forming or by forming. If necessary, sheet springs may also be provided with positive fit, by means of which the magnets may additionally be axially secured. Identical springs may also conditionally be used for different rotor diameters and rotor lengths.

As an alternative to the V-shape or the U-shape, C-shaped oval or circular metal strips or metal strips transitioning from an oval shape into a circular shape may be used. An advantage of this embodiment is an edge-free contact with the permanent magnet plates so that scraping or chipping can largely be avoidable.

In an advantageous development of the invention, the spring elements are curved so that the burs formed during manufacture, usually when cutting with shears, are shifted to the side of the sheet metal that does not come into contact with the permanent magnet plates. Scraping and chipping during the installation are thereby avoided.

The installation is particularly simple, if the spring elements exclusively are held non-positively in the clearances; the same also applies to permanent magnet plates that are exclusively held non-positively in the recesses. An uninstallation of the permanent magnet plates, which may be required for environmental protection reasons and for the purpose of recycling the valuable magnetic material, is likewise facilitated by the exclusively non-positive connection. The economics are also improved hereby over the entire life cycle of the product, up to the reuse of materials.

In a first embodiment, the number of spring elements corresponds to the number of permanent magnet plates. In this case, each spring element is supported on one side at a side surface of a permanent magnet plate and on the other side at a web. Preferably, all permanent magnet plates are pushed by the respective spring elements in the same direction, and thus imbalances are equalized and the symmetry of the magnetic field is maintained.

In a second particularly preferred embodiment, only half the number of spring elements are provided relative to the number of permanent magnet plates. In this embodiment, only every second one of the webs present in the first embodiment is provided. In the installed state, two permanent magnet plates are thereby separated from one another alternately by a web or by a spring element. The spring elements thus act on the side surfaces of two permanent magnet plates. The number of permanent magnet plates typically is an even number, whereby also in the second embodiment a symmetrical distribution of the permanent magnet plates results over the circumference of the permanent magnet rotor.

An alternative arrangement of the spring elements is also possible, wherein a main elastic line of the spring elements is directed radially outward and the sheet metal legs are directed radially inward. It can furthermore be provided that, within the clearance, the spring elements adjoin the laminated core radially on the outside.

Independently of the embodiment, provisions may be made in a particularly preferred variation that angular cross-section regions of the spring elements do not adjoin the planar side surfaces of the permanent magnet plates.

The spring elements preferably comprise a paramagnetic or diamagnetic material, such as stainless steel, bronze, copper beryllium or paramagnetic spring steel. These substances possess a high magnetic resistance, and therefore do not lead to magnetic short circuits.

The inventive permanent magnet rotor is intended primarily for brushless direct current motors, however, it is likewise also usable for synchronous motors and other types of motors.

BRIEF DESCRIPTION OF THE SEVERAL VIEWS OF THE DRAWINGS

The invention is explained in greater detail in the following using exemplary embodiments.

FIG. 1b shows a plan view of the permanent magnet rotor of FIG. 1a;

FIG. 2b is a detailed view of a portion of FIG. 2a;

FIG. 3b is a detailed view of a portion of FIG. 3a;

FIG. 3c shows a section through a permanent magnet rotor according to FIG. 3a;

FIG. 4b is a detailed view of a portion of FIG. 5a;

FIG. 6b shows a spatial representation of the variation from FIG. 6a;

DETAILED DESCRIPTION OF PREFERRED EMBODIMENTS

It is therefore an object of the present invention to produce a permanent magnet rotor of the aforementioned kind, which enables the permanent magnet plates to be installed securely, free of play, and thereby allows a magnetic circuit that is optimum for this construction, retains flexibility in the production of a large palette of permanent magnet rotors for different requirements and uses, in which imbalances are minimized by design, for which both the installation and also dismantling are possible in a simple manner, for which energy use in production is low and high environmental standards are satisfied both in production and in disposal, for which noise development in operation is minimized, tolerances as well as length changes due to thermal expansion may be compensated, which has good chemical and fatigue resistance, can be produced quickly and can be connected with a high mechanical strength between permanent magnet plates and laminated core can be achieved.

Figure 1A:
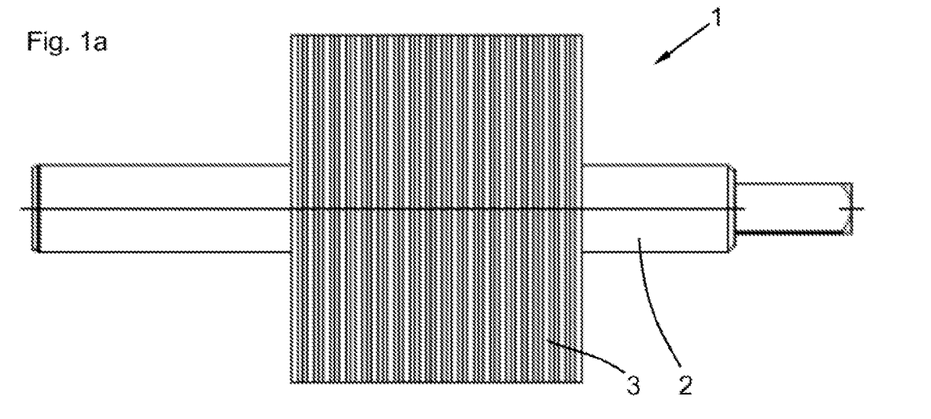
FIG. 1a shows a front view of a first embodiment of a permanent magnet rotor according to the invention.

FIG. 1a shows a front view of a first embodiment of a permanent magnet rotor 1 according to the invention, comprising a shaft 2, and a laminated rotor core 3, that comprises thin magnetic steel sheets that are insulated from one another in order to suppress eddy currents. The laminated rotor core 3 is pressed onto the shaft 2 and with this forms a compact structural group.

Figure 1B:
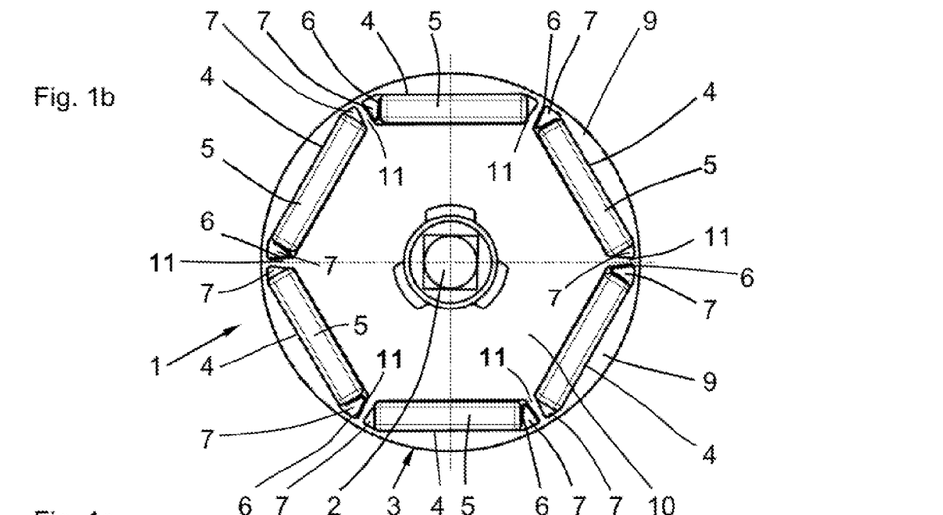

FIG. 1b shows a plan view of the permanent magnet rotor of FIG. 1a with the shaft 2, the laminated rotor core 3, recesses 4, permanent magnet plates 5, clearances 7 and spring elements 6. The recesses 4 are matched to the permanent magnet plates 5 so that a correct installation of the magnet plates is possible with a minimal air gap. A spring element is arranged in every second clearance 7 and pushes a permanent magnet plate 5 into a tapering region between the recess 4 and the clearance 7. Since the permanent magnet plates 5 are arranged near the periphery of the permanent magnet rotor 3, the outer contour of the clearance 7 follows the rotor periphery and is therefore angled relative to the recess. This commonly used geometry is employed in the present invention to keep the magnet free of play. The edges of the permanent magnet plates are slightly rounded, and are therefore jammed easily in the constriction. The laminated rotor core 3 is comprised of a care region 10, which extends between the shaft 2 and the permanent magnet plates 5, and an outer ring region 9, which is arranged radially outside of the permanent magnet plates 5 and is integral with the core region 10 via webs 11.

Figure 1C:
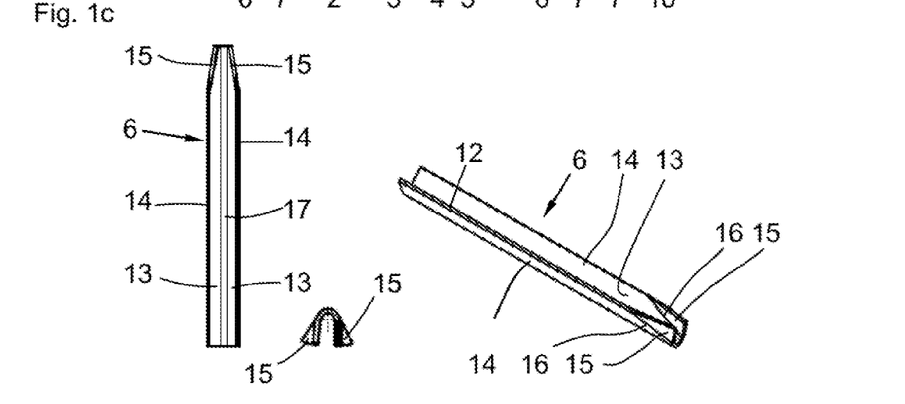
FIG. 1c shows a representation of a spring element.

FIG. 1c shows a spring element 6, which consists of an elongated metal strip that is curved or folded in a V-shape. One end of the spring element has advantageous insertion aids 15 which, in the present example, are curved inward on a crease line 16 running at an angle to the main bent line 17. The length of the spring element 6 corresponds approximately here to the length of the laminated rotor core 3 and the length of the permanent magnet plates 5; however, it can also be shorter. Burs 12, which are created when the metal strips are cut with shears, are located on the inside 13 of sheet metal legs 15 so that they cannot scrape away any sheet metal material during the installation.

Figure 2A:
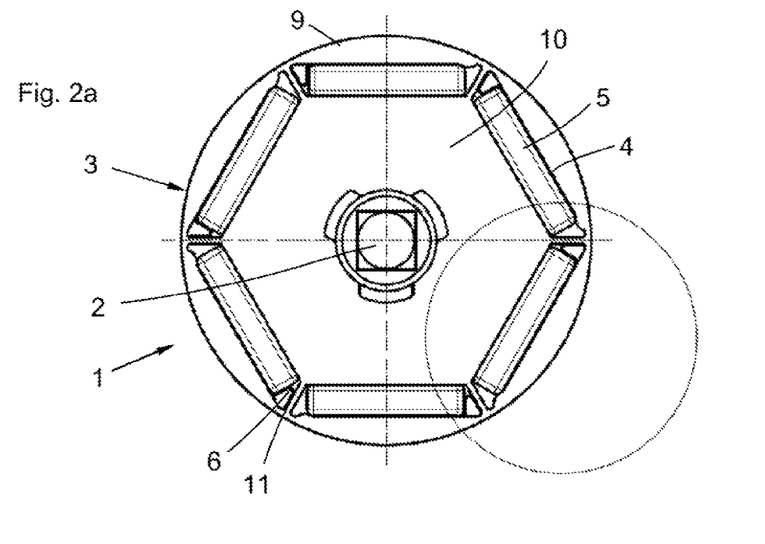
FIG. 2a shows an end view of a first variation of the first embodiment.

FIG. 2a shows a front view of a first variation of the first embodiment of the permanent magnet rotor 1, with the shaft 2, the laminated rotor core 3, the core region 10, the ring region 9, the recesses 4, the permanent magnet plates 5, the webs 11 and the spring elements 6.

Figure 2B:
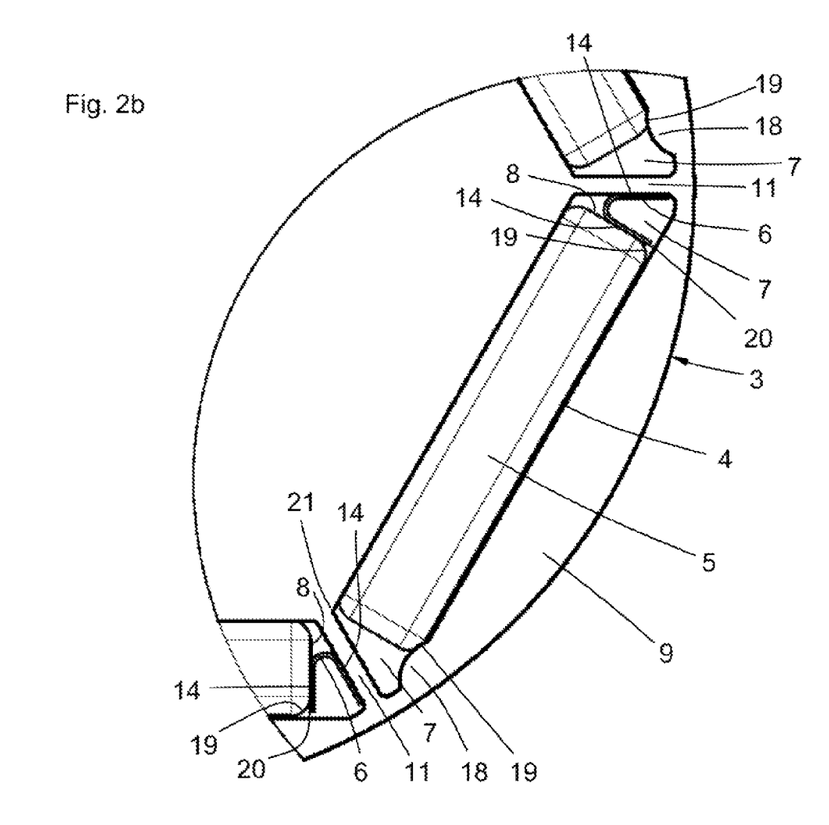

A section from FIG. 2a is shown enlarged in FIG. 2b. The permanent magnet plates 5 are accommodated in the recesses 4. A bulge 18 is provided at a transition region of the recesses 4 to a clearance 7, at the ring region 9 of the laminated rotor core 3, which bulge 18 interacts with a rounding 19 and, when acted upon with the force of the spring element 6 in the tangential direction, results in the permanent magnet plate 5 being free of play in the radial direction. In principle, absence of play would also be possible by placing the rounding 19 in a corner 12 of the clearance 7, but with smaller force components in the radial direction. The bulge 18 can be disposed both on the outside and on the inside of the recess 4, or on both sides of it. The flatter the angle at the placement point with the permanent magnet plate 5, the greater is the clamping effect. A greater distance of the permanent magnet plate 5 from the web 11, and therefore a greater magnetic resistance is also achievable due to the bulge 18. The webs 11 are dimensioned so that, on the one hand, they are as thin as possible in order to enter into magnetic saturation as quickly as possible and, on the other hand, sufficiently wide in order to ensure a sufficient stability of the laminated rotor core. Due to the symmetrical design, the centrifugal forces largely balance out, so that the webs 11 can be constructed relatively thin. The spring elements 6 are designed as V-shaped, curved sheet metal strips. The sheet metal legs 14 of each spring element 6 are located, on the one hand, on a web 11 and on the other, on a side surface 8 of a permanent magnet plate 5. The cut edge 20 of the respective spring element 16 in the region of a rounding 19 is thereby arranged, so that the permanent magnet plate 5 cannot be damaged during installation.

Figure 3A:
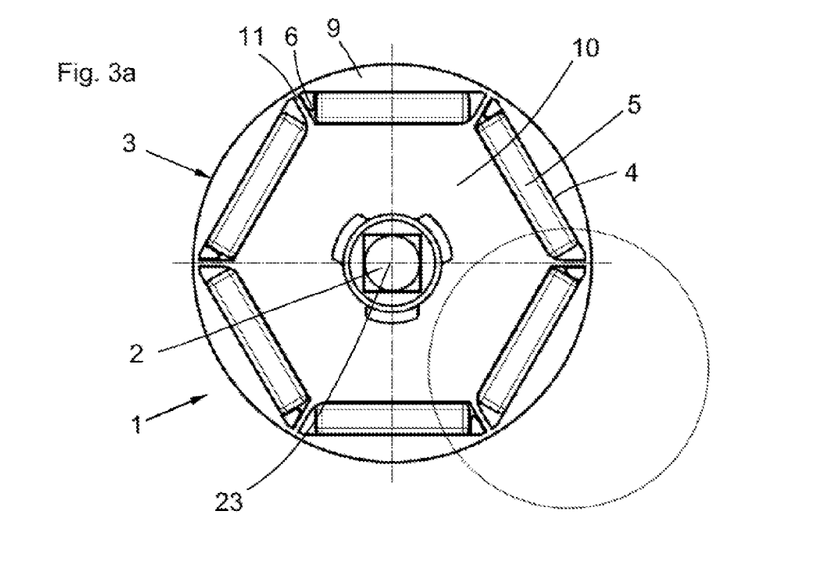
FIG. 3a shows an end view of a second variation of the first embodiment.

FIG. 3a shows a front view of a second variation of the first embodiment of the permanent magnet rotor 1, with the shaft 2, the laminated rotor core 3, the core region 10, the ring region 9, the recesses 4, the webs 11, the spring elements 6 and the permanent magnet plates 5.

Figure 3B:
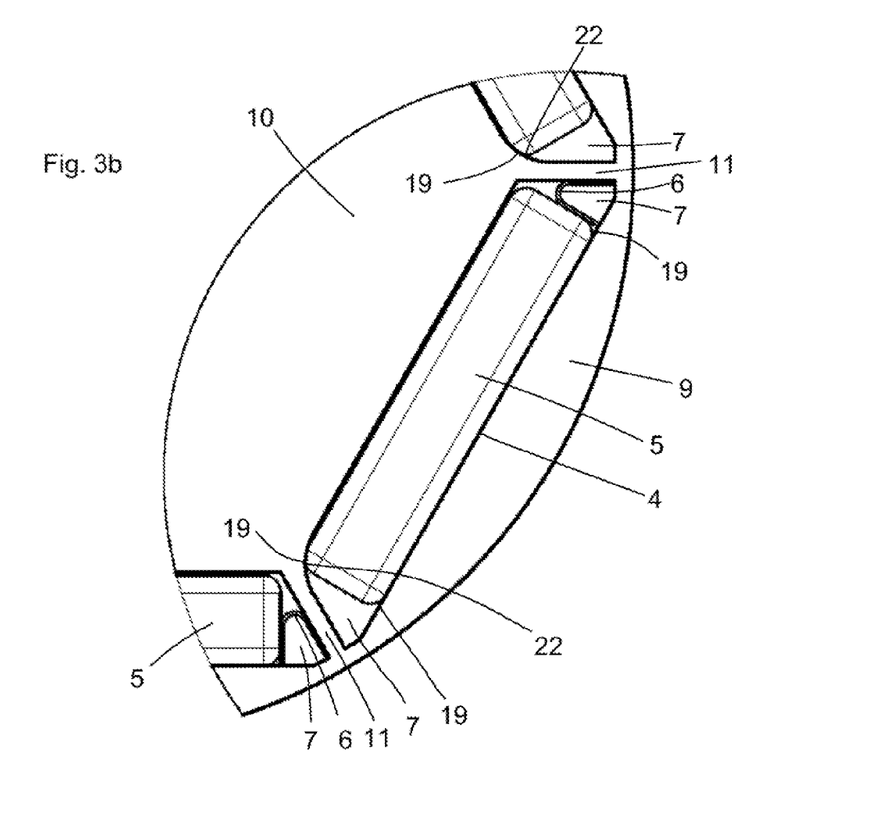

FIG. 3b shows an enlarged section from FIG. 3a, with the core region 10, the ring region 9, the recesses 4, the permanent magnet plates 5, and the spring elements 6. Instead of a bulge, a rounded transition region 22 is provided here between the recess 4, the clearance 7 and the web 11. This transition region 22 has an effect similar to that of the bulge 18 of FIGS. 2a and 2b—it forms a flat angle in the contact point with the permanent magnet plates 5, and therefore produces a radial freedom from play and jamming of the permanent magnet plates 5 when being acted upon by the force of a spring element 6. Precisely one spring element 6, which is disposed in every second clearance, is assigned to each permanent magnet plate 5. The spring elements 6 preferably all act in the same direction about the axis of rotation 23 (clockwise or counterclockwise).

Figure 3C:
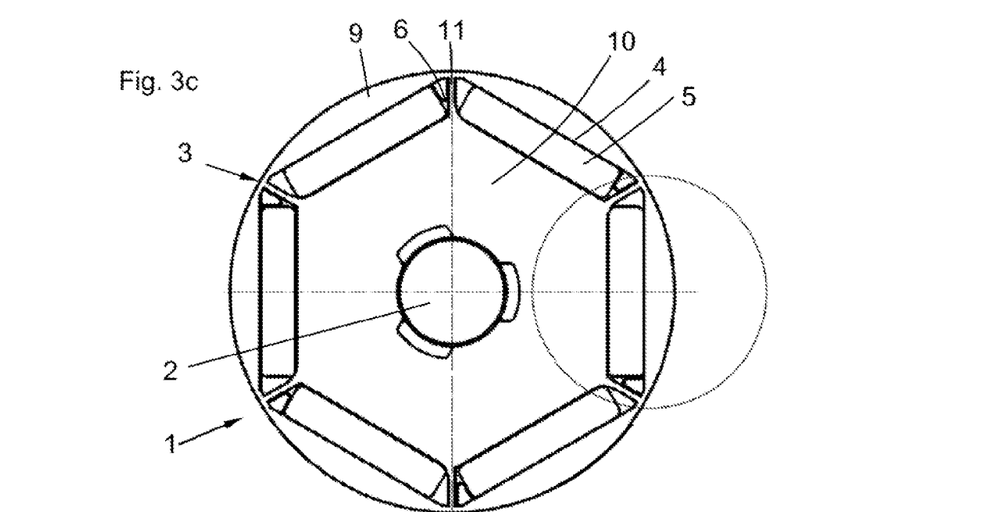

FIG. 3c shows a section through a permanent magnet rotor 1 according to FIG. 3a, with the laminated rotor core 3, the shaft 2, the recesses 4, the permanent magnet plates 5, the core region 10, the ring region 9, the webs 11 and the spring elements 6 (FIG. 3c is rotated by 30° relative to FIG. 3a).

Figure 3D:
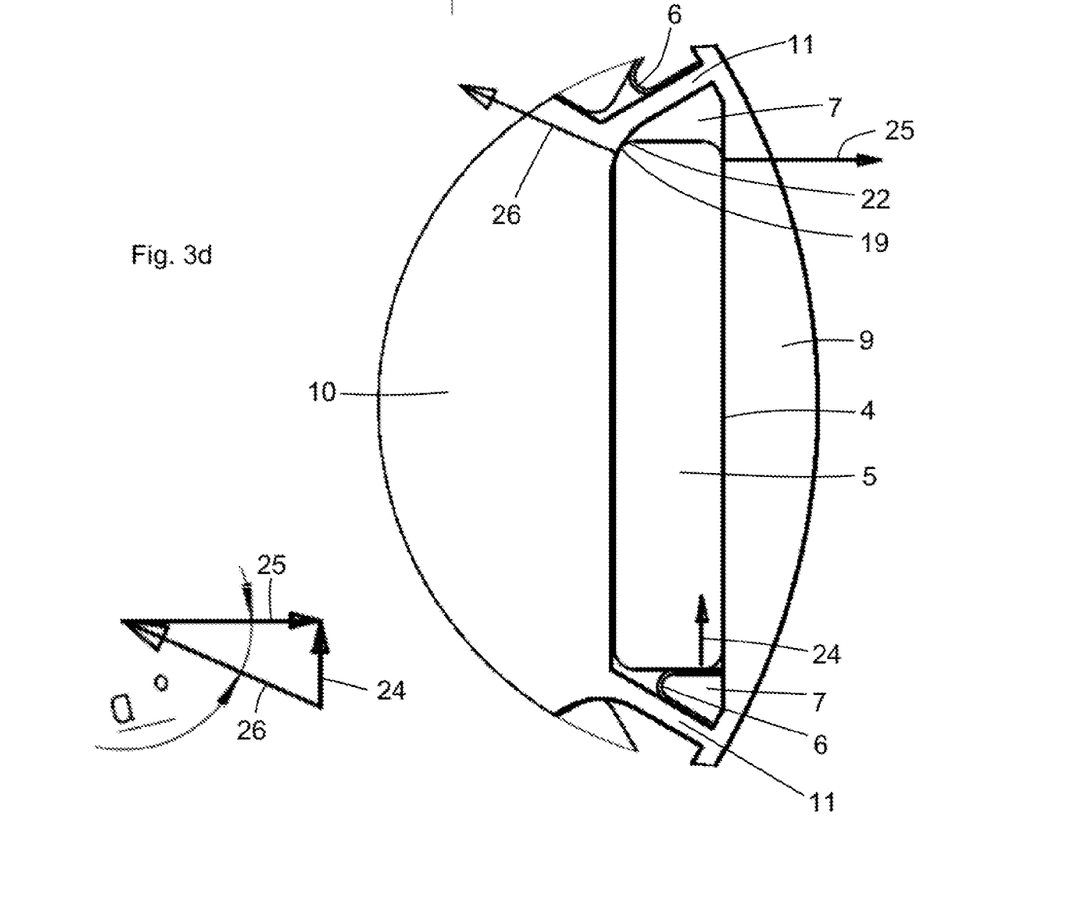
FIG. 3d is a detailed view of a portion of FIG. 3c.

FIG. 3d shows a section from FIG. 3c, with the force directions depending on an angle α, which represents the angle of the tangents at the rounding 19 of the permanent magnet plates 5 at the contact point with the transition region 22, relative to the spring force direction in the permanent magnet plate 5. The spring force 24 produces a radial force 25 and a resulting force 26.

Figure 4A:
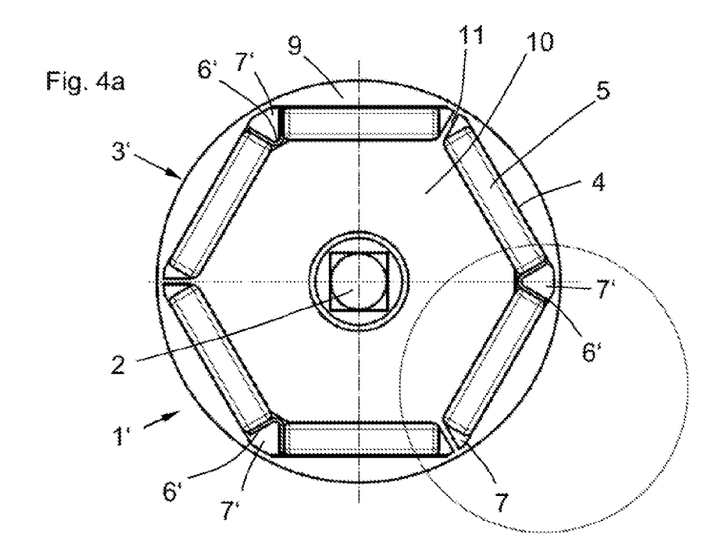
FIG. 4a shows an end view of a second embodiment of a permanent magnet rotor according to the invention.
Figure 4B:
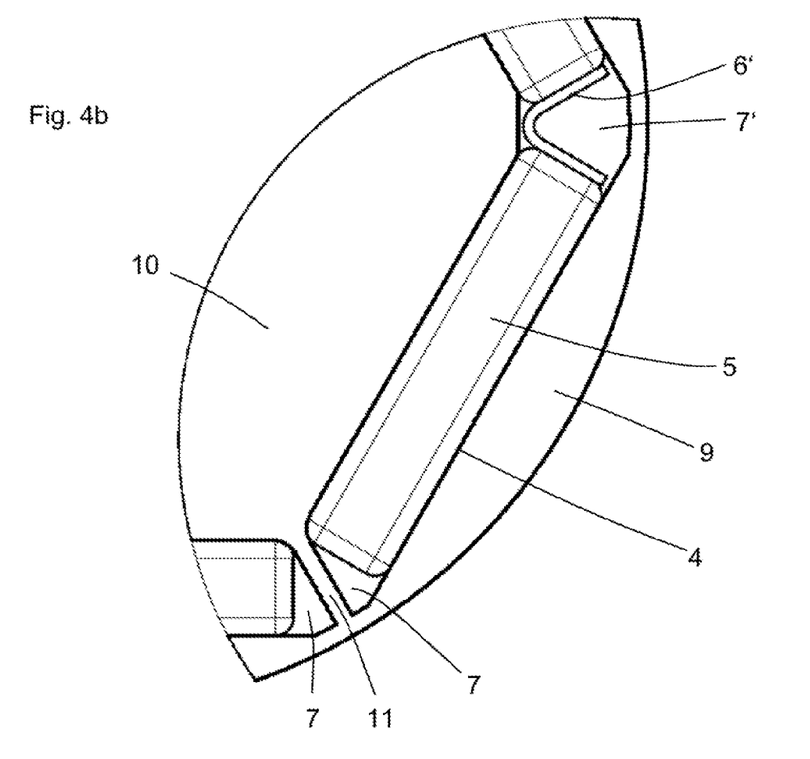

FIG. 4a and, in an enlarged section, 4b show an end view of a second embodiment of the permanent magnet rotor 1' according to the invention, wherein the essential difference from the first embodiment is that every second web 11 and every second spring element 6' have been omitted. A portion of the original clearances 7 were merged into a common spring clearance 7'. The springs 6' are no longer supported here on a web, but rather on an additional permanent magnet plate 5. In the present example, the ring region 9 is integral with the core region 10 over three webs.

Figure 5A:
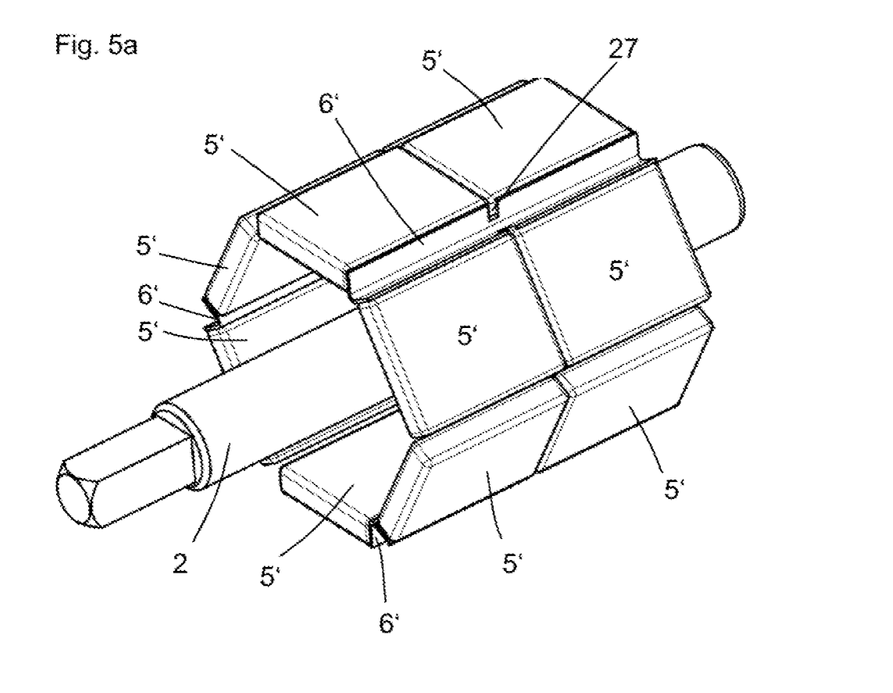
FIG. 5a shows a spatially depicted arrangement of a variant of the second embodiment.

The permanent magnet plates 5 may also be composed of multiple individual plates, without leaving the protective scope of the invention. Such an arrangement of a variation of the second embodiment is spatially depicted in FIG. 5a, in which the laminated rotor core is not depicted. Shown are the shaft 2, the permanent magnet plates 5' divided in the axial direction, and variants of the spring element 6' which, through a slit 27, can compensate for slight geometric differences between the permanent magnet plates 5' that adjoin one another.

Figure 5B:
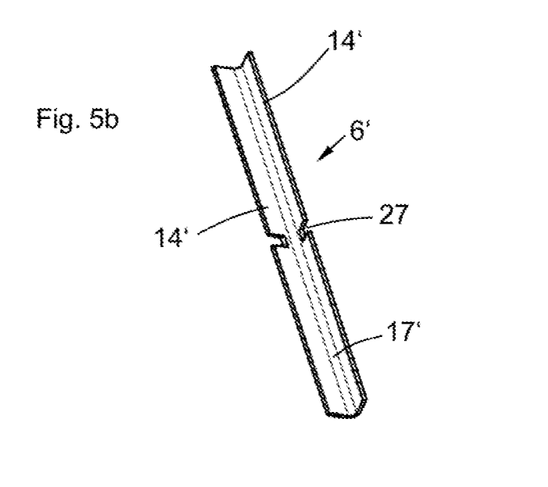
FIG. 5b shows a first variation of the spring element.

FIG. 5b shows the variant of the spring element 6' as a single part with the slit 27, which extends across approximately ⅔ of the leg height in both sheet metal legs 14'. The slits 27 are arranged on either side of the main bending line 17'.

Figure 6A:
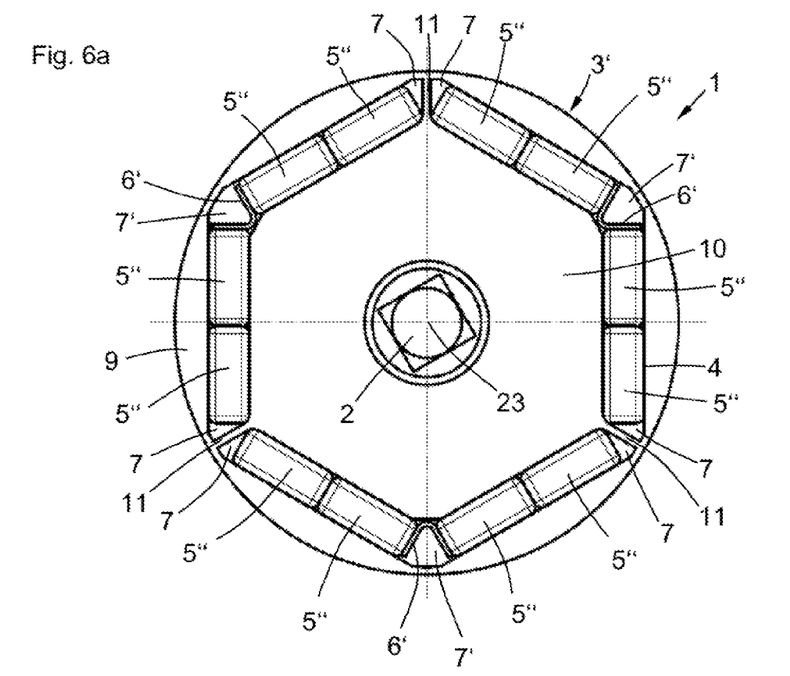
FIG. 6a shows an end view of a second variation of the second embodiment.
Figure 6B:
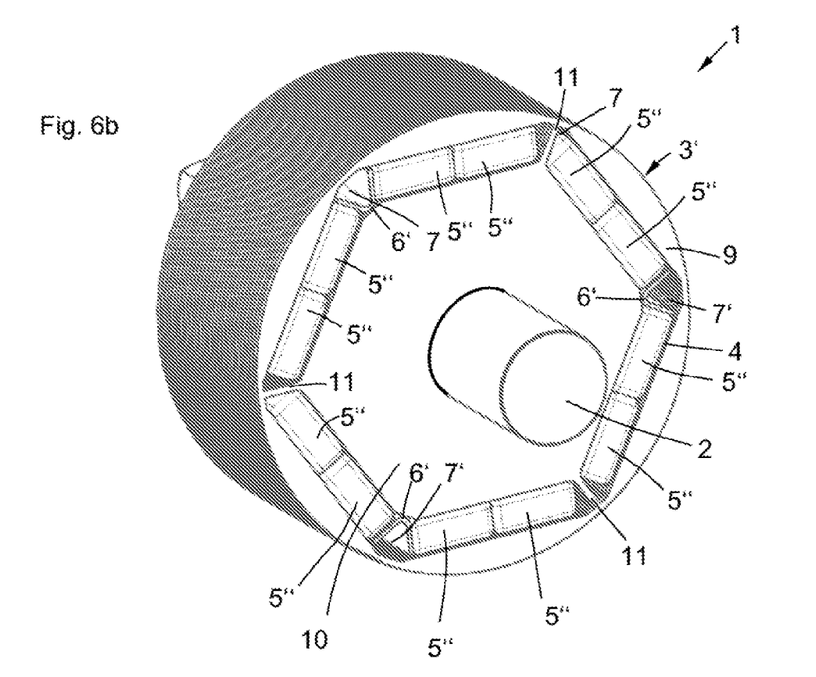

The permanent magnet plates may also be divided in the tangential direction, without leaving the protective scope of the invention. FIGS. 6a and 6b show such a variant of the permanent magnet rotor 1 as a second variant of the second embodiment, with the shaft 2, the laminated rotor core 3', with the core region 10, the ring region 9, the webs 11, the recesses 4, the clearances 7 and 7', permanent magnet plates 5" divided in the circumferential direction, and the spring elements 6'.

In principle, it is also possible to combine permanent magnet plates divided axially and in the circumferential direction.

Figure 7:
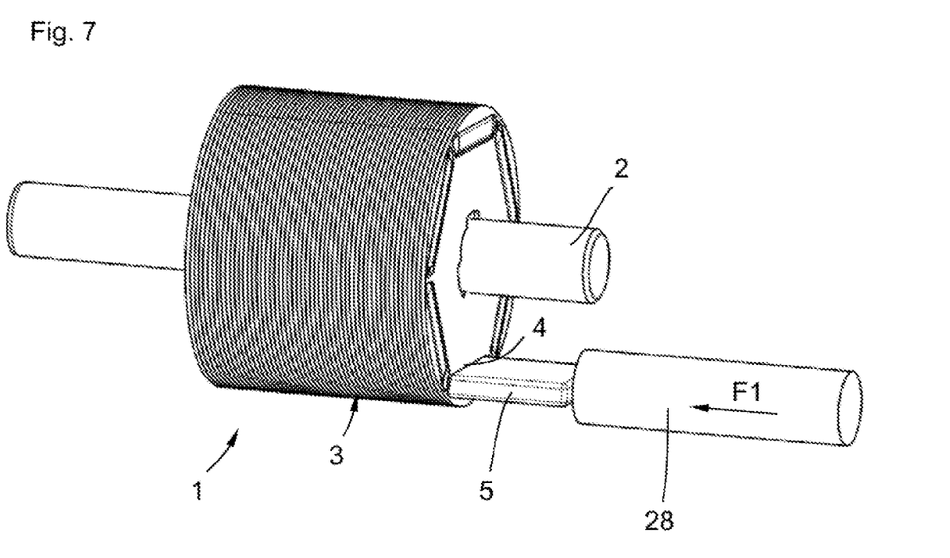
FIG. 7 shows a spatial presentation of an installation process of a permanent magnet plate.

FIG. 7 shows a representation of an installation process of a permanent magnet plate 5 into one of the recesses 4 of the laminated rotor core 3 with the aid of a magnetic press-fit die 28, wherein the magnetic press-fit die exerts a force F1 on the permanent magnet plate 5.

Figure 8:
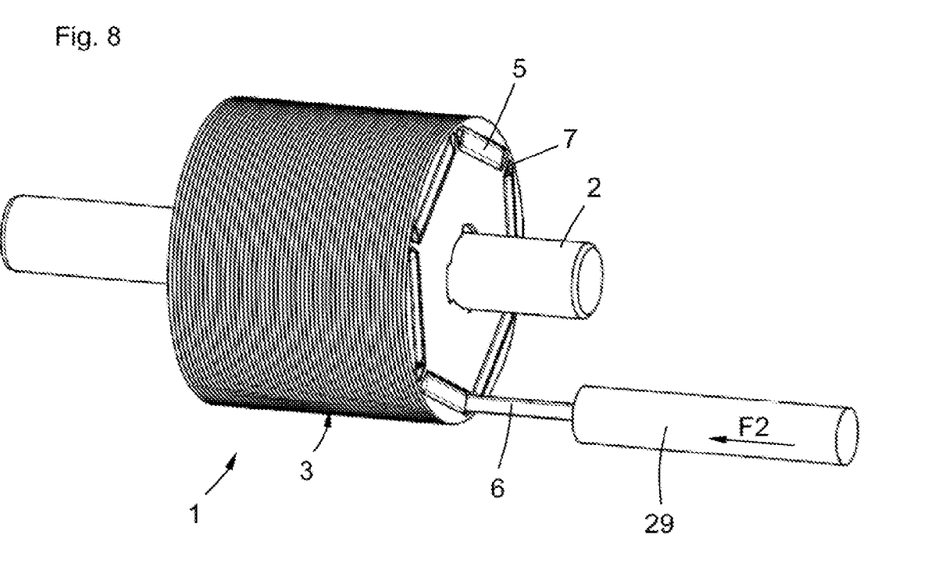
FIG. 8 shows a spatial representation of an installation process of a spring element.

FIG. 8 shows a representation of an installation process of a spring element 6 into one of the clearances 7 of the laminated rotor core 3 with the aid of a magnetic press-fit die 29, wherein the magnetic press-fit die exerts a force F2 on the spring elements 6. Both press-fit processes may be implemented horizontally as well as vertically.

Figure 9:
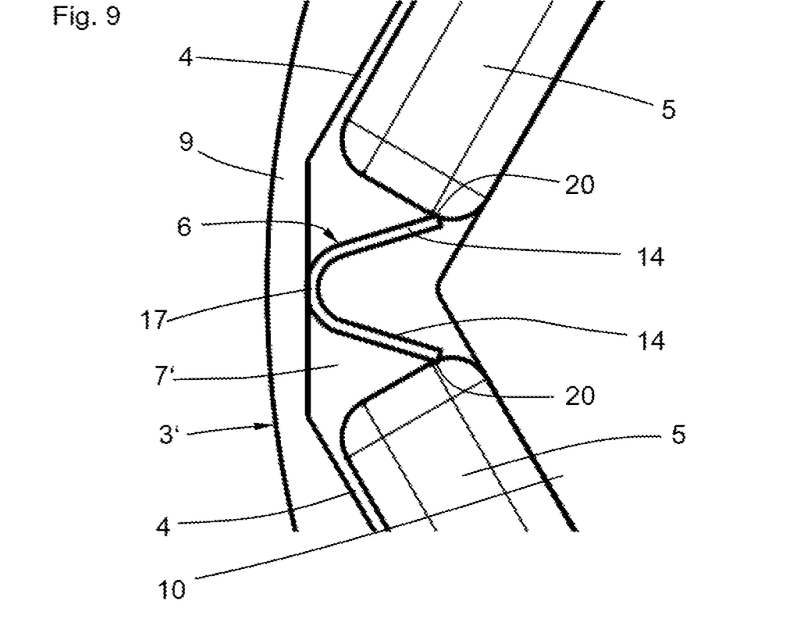
FIG. 9 shows a variant of the installation position of the spring element.

FIG. 9 shows a variation of the installation position of the spring element 6, wherein the sheet metal legs 14 point inward while the main elastic bended portion 17 points radially outward. Moreover, the spring element 6 lies within the clearance 7' at the ring region 9. Here the spring element 6 acts on the permanent magnet plates 5 with their cut edges 20 and forces them tangentially in the end of the recess 4 that is situated in the direction opposite the clearance 7'.

Figure 10:
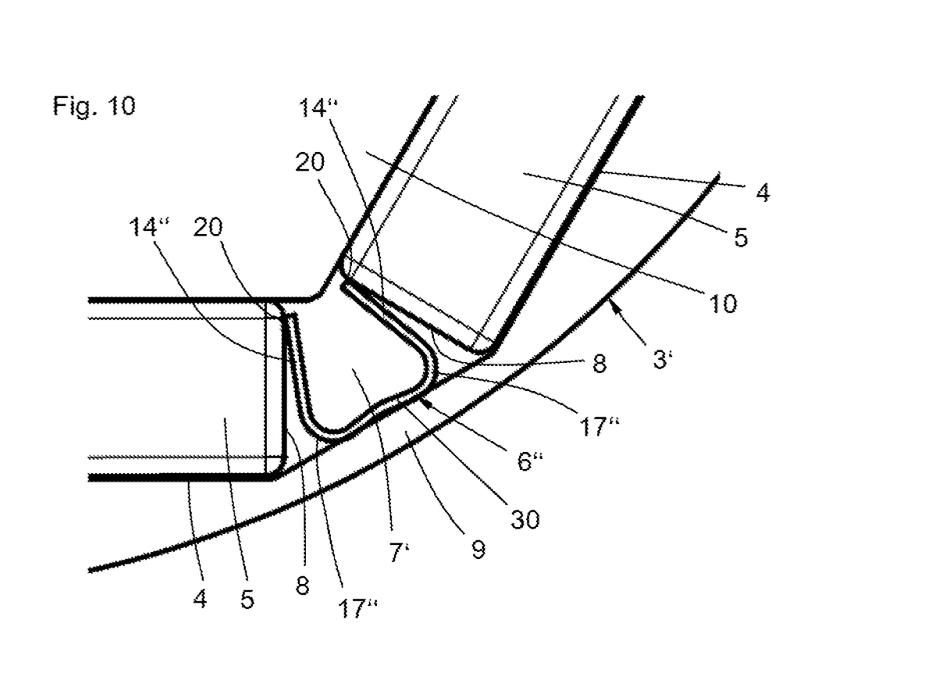
FIG. 10 shows a third variation of the spring element in a similar, installed position.

A third variation of the spring element 6" is shown in the installed state in FIG. 10. As in FIG. 9, the sheet metal legs 14" are also directed radially inwards here. The spring element 6" is largely designed in a U-shape, a yoke 30, which connects the sheet metal legs 14" with one another within the clearance T, lying radially outward at the ring region 9 of the laminated core 3'. The spring element 6" does in fact also act upon the permanent magnet plates 5 with their cut edges 20 here, but at a flatter angle of the sheet metal legs 14" relative to the side surfaces 8 of the permanent magnet plates 5. The U-shaped spring element 6" has two main bending lines 17" that are arranged near to the ring region 9 of the laminated core 3'.

In the description of the Figure, the two embodiments of the invention—in particular of the laminated rotor core—have been labeled 3 or 3'. The additional variants pertaining to bulge 18 and transition region 22 were not identified separately.

It is to be understood that the present invention is not limited to the illustrated embodiments described herein. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE NUMBERS

1 permanent magnet rotor
2 shaft
3, 3' laminated rotor core
4 recess
5, 5', 5" permanent magnet plate
6, 6', 6" spring element
7, T clearance
8 side surface
9 ring region
10 core region
11 web
12 fin
13 inner side
14, 14', 14" metal sheet leg
15 insertion aids
16 bend line
17, 17', 17" main bending line
18 bulge
19 rounding
20 edge cut
21 corner
22 transition region
23 rotation axis
24 spring force
25 radial force
26 resulting force
27 slit
28 magnetic press-fit die
29 elastic press-fit die
30 yoke

The invention claimed is:

1. A permanent magnet rotor for an electronically commutated direct current motor, the permanent magnet rotor comprising:
   a shaft;
   a laminated rotor core carried by the shaft;
   permanent magnet plates having a side surface and an edge;
   rectangular recesses extending tangentially along the laminated rotor core, the recesses being closed over the entire circumference of the laminated rotor core, near its periphery, for accommodating the planar permanent magnet plates, respectively at least one permanent magnet plate being accommodated in each rectangular recess;
   elongated spring elements made of a magnetic, non-conductive material for holding the permanent magnet plates non-positively without play;
   clearances defined in the rectangular recesses in the tangential direction, each clearance adjoining a permanent magnet plate and extending over the side surface of the permanent magnet plate;
   a radially outer ring region and a radially inner ring defined in the laminated rotor core, wherein the ring regions are primarily limited by the rectangular recesses and the clearances and are integral with a core region over thin radial webs;
   each spring element being accommodated in a portion of the clearance adjoining the permanent magnet plate in the tangential direction;
   a spring force of each spring element acting predominantly tangentially on the side surface of the permanent magnet plate,
   each spring element having a first end resting on one side on the side surface of a permanent magnet plate; and
   each spring element having a second end resting on the other side on one of the webs so as to be without play in the radial direction.

2. The permanent magnet rotor according to claim 1, wherein the spring elements are metal strips, which, in cross section, are V-shaped, U-shaped, or metal strips transitioning in cross section from a V-shape to a U-shape.

3. The permanent magnet rotor according to claim 2, wherein burs that are created in the manufacture of the spring elements are located on an inner side of the metal strips.

4. The permanent magnet rotor according to claim 1, wherein the spring elements are metal strips, which, in cross section, are C-shaped oval or circular or metal strips transitioning in cross section from an oval shape to a circular shape.

5. The permanent magnet rotor according to claim 1, wherein the number of spring elements corresponds to the number of permanent magnet plates.

6. The permanent magnet rotor according to claim 1, wherein the number of spring elements corresponds to half of the number of permanent magnet plates.

7. The permanent magnet rotor according to claim 6, wherein the number of webs corresponds to half of the number of permanent magnet plates.

8. The permanent magnet rotor according to claim 7, wherein two of the permanent magnet plates are alternately separated from one another by a web or by a spring element.

9. The permanent magnet rotor according to claim 7, wherein two of the permanent magnet plates are alternately separated from one another by a web or by a spring element.

10. The permanent magnet rotor according to claim 6, wherein the number of webs corresponds to half of the number of permanent magnet plates.

11. The permanent magnet rotor according to claim 1, where each spring element has a main bending line which is directed radially outward and a metal sheet leg which is directed radially inward.

12. The permanent magnet rotor according to claim 11, wherein each spring element is in contact with the laminated core within one of the clearances radially on the outside.

13. The permanent magnet rotor according to claim 1, wherein angular cross section regions of the spring elements do not adjoin the planar side surfaces of the permanent magnet plates.

14. The permanent magnet rotor according to claim 1, wherein the edge of each permanent magnet plate is rounded or beveled.

15. The permanent magnet rotor according to claim 1, wherein the spring elements consist of stainless steel bronze, copper beryllium or paramagnetic spring steel.

16. An electric motor with a permanent magnet rotor according to claim 1.

17. The permanent magnet rotor according to claim 1, wherein the spring elements are metal strips, which, in cross section, are V-shaped, U-shaped, or metal strips transitioning in cross section from a V-shape to a U-shape.

18. The permanent magnet rotor according to claim 1, wherein the spring elements are metal strips, which, in cross section, are C-shaped oval or circular or metal strips transitioning in cross section from an oval shape to a circular shape.

19. The permanent magnet rotor according to claim 1, wherein the number of spring elements corresponds to half of the number of permanent magnet plates.

20. A permanent magnet rotor for an electronically commutated direct current motor, the permanent magnet rotor comprising:
 a shaft;
 a laminated rotor core carried by the shaft;
 permanent magnet plates having a side surface and an edge;
 rectangular recesses extending tangentially along the laminated rotor core, the recesses being closed over the entire circumference of the laminated rotor core, near its periphery, for accommodating the planar permanent magnet plates, respectively at least one permanent magnet plate being accommodated in each rectangular recess;
 elongated spring elements made of a magnetic, non-conductive material for holding the permanent magnet plates non-positively without play;
 clearances defined in the rectangular recesses in the tangential direction, each clearance adjoining a permanent magnet plate and extending over the side surface of the permanent magnet plate;
 a radially outer ring region and a radially inner ring defined in the laminated rotor core, wherein the ring regions are primarily limited by the rectangular recesses and the clearances and are integral with a core region over thin radial webs;
 each spring element being accommodated in a portion of the clearance adjoining the permanent magnet plate in the tangential direction;
 a spring force of each spring element acting predominantly tangentially on the side surface of the permanent magnet plate,
 each spring element having a first end resting on one side on the side surface of a permanent magnet plate; and
 each spring element having a second end resting on a side surface of an additional permanent magnet plate so as to be without play in the radial direction.

\* \* \* \* \*